US007356707B2

(12) United States Patent
Foster et al.

(10) Patent No.: US 7,356,707 B2
(45) Date of Patent: Apr. 8, 2008

(54) INITIALIZING, MAINTAINING, UPDATING AND RECOVERING SECURE OPERATION WITHIN AN INTEGRATED SYSTEM EMPLOYING A DATA ACCESS CONTROL FUNCTION

(75) Inventors: Eric M. Foster, Owego, NY (US); William E. Hall, Clinton, CT (US); Marcel Catalin Rosu, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 979 days.

(21) Appl. No.: 10/691,924

(22) Filed: Oct. 23, 2003

(65) Prior Publication Data

US 2004/0083375 A1 Apr. 29, 2004

Related U.S. Application Data

(62) Division of application No. 10/125,803, filed on Apr. 18, 2002, now Pat. No. 6,715,085.

(51) Int. Cl.
*G06F 11/30* (2006.01)
(52) U.S. Cl. .................. 713/189; 713/100; 713/193
(58) Field of Classification Search ............... 713/100, 713/189, 193
See application file for complete search history.

(56) References Cited

U.S. PATENT DOCUMENTS

| 4,168,396 A | 9/1979 | Best ........................... 178/22 |
| 4,465,901 A | 8/1984 | Best ....................... 178/22.08 |

(Continued)

FOREIGN PATENT DOCUMENTS

EP    0961193 A2    12/1999

(Continued)

OTHER PUBLICATIONS

Evans et al., pending U.S. patent application entitled "Control Function Employing A Requesting Master ID And A Data Address To Qualify Data Access Within An Integrated System", U.S. Appl. No. 10/125,527, filed Apr. 18, 2002.

(Continued)

*Primary Examiner*—Nasser Moazzami
*Assistant Examiner*—Shanto M Z Abedin
(74) *Attorney, Agent, or Firm*—William H. Steinberg, Esq.; Kevin P. Radigan, Esq.; Heslin Rothenberg Farley & Mesiti, P.C.

(57) ABSTRACT

Techniques are provided for initializing, maintaining, updating and recovering secure operation within an integrated system. The techniques, which employ a data access control function within the integrated system, include authenticating by a current level of software a next level of software within an integrated system. The authenticating occurs before control is passed to the next level of software. Further, an ability of the next level of software to modify an operational characteristic of the integrated system can be selectively limited via the data access control function. Techniques are also provided for initializing secure operation of the integrated system, for migrating data encrypted using a first key set to data encrypted using a second key set, for updating software and keys within the integrated system, and for recovering integrated system functionality following a trigger event.

4 Claims, 16 Drawing Sheets

U.S. PATENT DOCUMENTS

| | | | |
|---|---|---|---|
| 4,797,853 A | 1/1989 | Savage et al. | 364/900 |
| 4,920,483 A | 4/1990 | Pogue et al. | 364/200 |
| 4,951,249 A | 8/1990 | McClung et al. | 364/900 |
| 5,144,659 A | 9/1992 | Jones | 380/4 |
| 5,421,006 A | 5/1995 | Jablon et al. | 395/575 |
| 5,440,713 A | 8/1995 | Lin et al. | 395/485 |
| 5,464,087 A | 11/1995 | Bounds et al. | 194/200 |
| 5,491,827 A | 2/1996 | Holtey | 395/800 |
| 5,561,817 A | 10/1996 | McCormack et al. | 395/842 |
| 5,564,054 A | 10/1996 | Bramnick | |
| 5,602,536 A | 2/1997 | Henderson et al. | 340/825.31 |
| 5,610,980 A * | 3/1997 | Johnson et al. | 713/189 |
| 5,647,017 A | 7/1997 | Smithies et al. | 382/119 |
| 5,703,952 A | 12/1997 | Taylor | 380/44 |
| 5,757,919 A | 5/1998 | Herbert et al. | 380/25 |
| 5,778,316 A | 7/1998 | Persson et al. | 455/434 |
| 5,809,230 A * | 9/1998 | Pereira | 726/35 |
| 5,825,878 A | 10/1998 | Takahashi et al. | 380/4 |
| 5,841,868 A | 11/1998 | Helbig, Sr. | 380/25 |
| 5,887,131 A | 3/1999 | Angelo | 395/188.01 |
| 5,893,921 A | 4/1999 | Bucher et al. | 711/146 |
| 5,912,453 A | 6/1999 | Gungl et al. | 235/492 |
| 5,918,007 A | 6/1999 | Blackledge, Jr. et al. | 395/186 |
| 5,930,824 A * | 7/1999 | Anglin et al. | 711/162 |
| 5,935,247 A | 8/1999 | Pai et al. | 713/200 |
| 5,940,513 A | 8/1999 | Aucsmith et al. | 380/25 |
| 6,021,476 A | 2/2000 | Segars | 711/152 |
| 6,023,510 A | 2/2000 | Epstein | 380/25 |
| 6,052,763 A | 4/2000 | Maruyama | 711/152 |
| 6,101,543 A | 8/2000 | Alden et al. | 709/229 |
| 6,116,402 A | 9/2000 | Beach et al. | 194/216 |
| 6,182,142 B1 | 1/2001 | Win et al. | 709/229 |
| 6,182,217 B1 | 1/2001 | Sedlak | 713/172 |
| 6,226,742 B1 | 5/2001 | Jakubowski et al. | 713/170 |
| 6,230,269 B1 | 5/2001 | Spies et al. | 713/182 |
| 6,311,255 B1 | 10/2001 | Sadana | 711/152 |
| 6,609,169 B1 * | 8/2003 | Powell | 710/301 |
| 6,775,778 B1 * | 8/2004 | Laczko et al. | 713/194 |
| 6,971,051 B2 * | 11/2005 | Taylor et al. | 714/718 |
| 7,055,038 B2 * | 5/2006 | Porter et al. | 713/193 |
| 2001/0044886 A1 | 11/2001 | Cassagnol et al. | |
| 2002/0013911 A1 | 1/2002 | Cordella et al. | |
| 2002/0032867 A1 | 3/2002 | Kellum | |
| 2002/0042882 A1 * | 4/2002 | Dervan et al. | 713/200 |
| 2002/0108045 A1 * | 8/2002 | Wells | 713/182 |

FOREIGN PATENT DOCUMENTS

| | | |
|---|---|---|
| WO | WO 98/015086 A1 | 4/1998 |
| WO | WO0075759 A1 | 12/2000 |

OTHER PUBLICATIONS

Foster et al., pending U.S. patent application entitled "Control Function Implementing Selective Transparent Data Authentication Within An Integrated System", U.S. Appl. No. 10/125,115, filed Apr. 18, 2002.

Foster et al., pending U.S. patent application entitled "Control Function With Multiple Security States For Facilitating Secure Operation Of An Integrated System", U.S. Appl. No. 10/125,708, filed Apr. 18, 2002.

S. Weingart, "Physical Security Devices for Computer Subsystems: A Survey of Attacks and Defenses", Proceedings of Cryptographic Hardware and Embedded Systems—CHES 2000, Second International Workshop, Worcester, MA, USA, Aug. 17-18, 2000, pp. 1-14.

C. Jutla, "Encryption Modes with Almost Free Message Integrity", Proc. Eurocrypt 2001, pp. 529-544, LNCS 2045.

D. Lie, et al., "Architectural Support for Copy and Tamper Resistant Software", ASPLOS-IX 2000, ACM 0-89791-88-6/97/05, Cambridge, Massachusetts USA.

European Search Report, European Patent Office, EP Application Serial No. 06100430.5-1245, dated Nov. 26, 2007 (8 pgs).

* cited by examiner

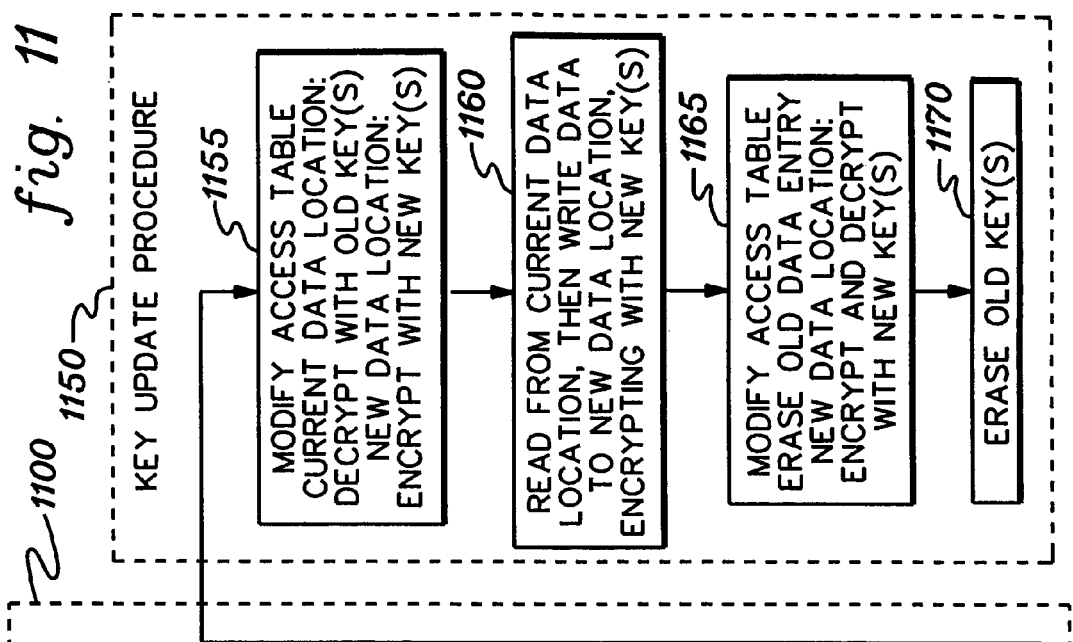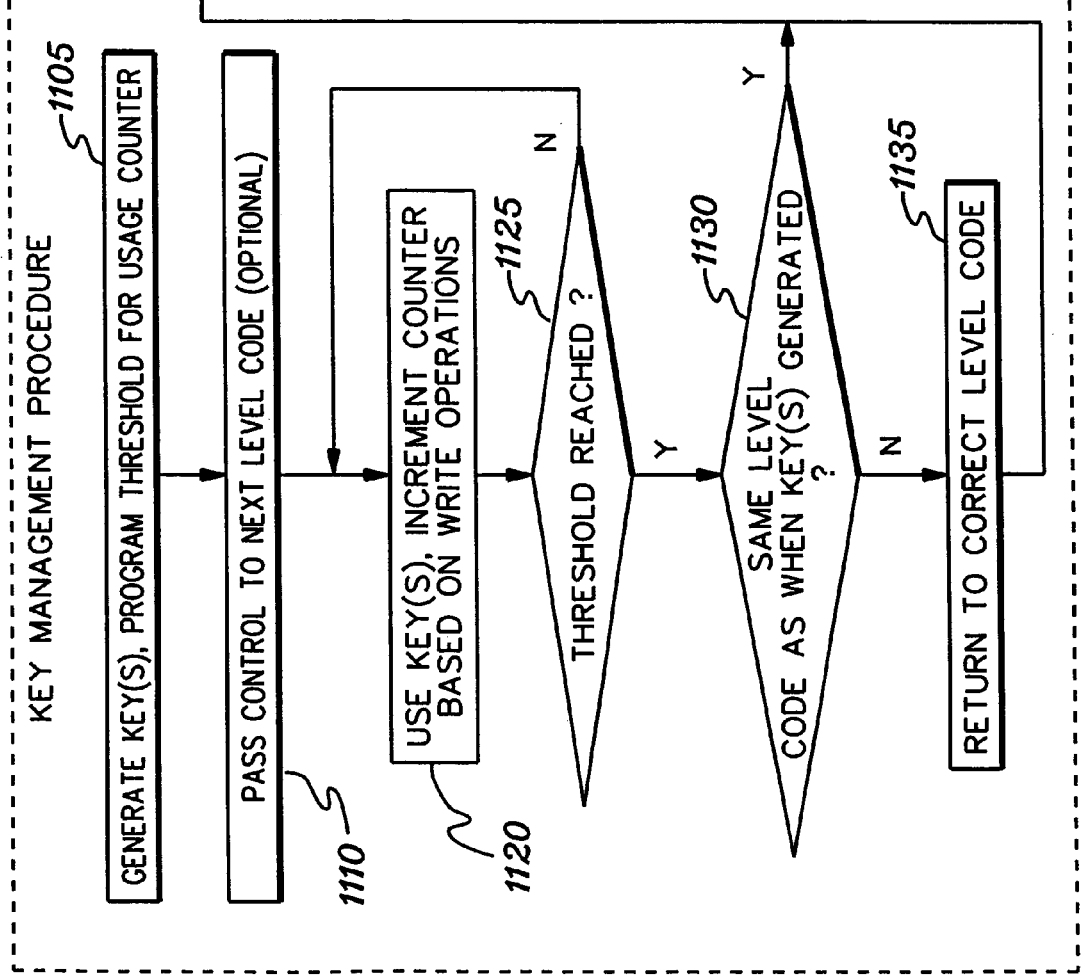
fig. 11

INITIALIZING, MAINTAINING, UPDATING AND RECOVERING SECURE OPERATION WITHIN AN INTEGRATED SYSTEM EMPLOYING A DATA ACCESS CONTROL FUNCTION

CROSS-REFERENCE TO RELATED APPLICATIONS

This application is a divisional of U.S. patent application Ser. No. 10/125,803, filed Apr. 18, 2002, entitled "Initializing, Maintaining, Updating And Recovering Secure Operation Within An Integrated System Employing A Data Access Control Function," the entirety of which is hereby incorporated herein by reference.

In addition, this application contains subject matter which is related to the subject matter of the following applications, each of which is assigned to the same assignee as this application and filed on the same day as this application. Each of the below listed applications is hereby incorporated herein by reference in its entirety:

"CONTROL FUNCTION EMPLOYING A REQUESTING MASTER ID AND A DATA ADDRESS TO QUALIFY DATA ACCESS WITHIN AN INTEGRATED SYSTEM," by Evans et al., U.S. Ser. No. 10/125,527, filed Apr. 18, 2002;

"CONTROL FUNCTION WITH MULTIPLE SECURITY STATES FOR FACILITATING SECURE OPERATION OF AN INTEGRATED SYSTEM," by Foster et al., U.S. Ser. No. 10/125,115, filed Apr. 18, 2002; and "CONTROL FUNCTION IMPLEMENTING SELECTIVE TRANSPARENT DATA AUTHENTICATION WITHIN AN INTEGRATED SYSTEM," by Foster et al., U.S. Ser. No. 10/125,708, filed Apr. 18, 2002.

TECHNICAL FIELD

This invention relates generally to data request handling and transfer of data within an integrated system, and more particularly, to techniques, implemented at least partially via a data access control function of an integrated system, for initializing, maintaining, updating and recovering secure operation of the integrated system.

BACKGROUND OF THE INVENTION

Multiple master functions are today being commonly integrated onto a single system chip. When initially defining an architecture for the integration of multiple discrete components onto a single chip, access to external devices can be an issue. For example, an MPEG video decoder system often employs external memory for various data areas, or buffers such as frame buffers. This external memory is conventionally implemented using either DRAM or SDRAM technology.

Two approaches are typical in the art for accessing off-chip devices. In a first approach, each on-chip functional unit is given access to the needed external device(s) through a data bus dedicated to that particular unit. Although locally efficient for accessing the external device, globally within the integrated system this approach is less than optimal. For example, although each function will have complete access to its own external memory area, there is no shared access between functions of the integrated system. Thus, transferring data from one memory area to another memory area of the system is often needed. This obviously increases data transfers and can degrade performance of the overall system, i.e., compared with a shared memory system.

Another approach is to employ a single common bus within the integrated system which allows one or more functional units of the system to communicate to external devices through a single port. Although allowing the sharing of devices, one difficulty with this approach concerns controlling access to content or other sensitive data in the integrated system. For example, when using a large common memory pool in an integrated design, it becomes difficult to prevent unauthorized access to protected memory spaces, such as compressed data supplied by a transport demultiplexer to a decoder of a set-top box. This is especially true for a system where the programming interface is open and outside development is encouraged. Each of the functional masters should be able to access the memory space and it is not possible to differentiate whether an access is from a trusted master or an outside request, e.g., coming through an untrusted or open master.

In addition, when working with a system-on-chip design with multiple functional masters using shared memory, it is desirable to provide a mechanism for protecting the data from unauthorized access, particularly when the data comprises the device's system programming code. More particularly, facilitating initialization of a secure operating environment begins by ensuring that the system code is secure and performs the functions intended. In order to guarantee a secure operating environment, therefore, the integrated system should be activated or booted in a secure mode.

In view of the above, various needs exist in the art for enhanced data access control approaches for an integrated system. More particularly, needs exist for techniques to initialize, maintain, update and recover secure operation of an integrated system.

SUMMARY OF THE INVENTION

The shortcomings of the prior art are overcome and additional advantages are provided through the provision of a method of initializing secure operation of an integrated system is provided. This method includes: generating at least one key for the integrated system; loading initial code into the integrated system, the loading including using the at least one key to encrypt the initial code via a data access control function of the integrated system; and reinitializing the integrated system using the encrypted initial code.

In a further aspect, a method of recovering integrated system functionality following a trigger event is provided. This method includes automatically establishing a reduced level of functionality within the integrated system following a tamper detection trigger event; and allowing for full functional recovery of the integrated system through a user selectively employing a trusted recovery procedure.

Systems and computer program products corresponding to the above-summarized methods are also disclosed herein.

Advantageously, the secure operation techniques disclosed herein can be used to initialize, maintain, update and/or recover a secure operating environment within an integrated system. More particularly, the techniques presented provide an ability to limit updates to operational characteristics maintained by a data access control function. The operational characteristics may include one or more of a key set, an access table, an access level, and access parameters employed by different levels of software within the integrated system. This ability to limit updates provides the different levels of software with hierarchical security privileges.

The techniques presented herein further provide an ability to make updates in the field in a secure manner, including the use of version numbers to prevent replay of an older version of software or other data. Also presented is an ability to migrate encrypted data from a first key set to a second key set as part of a key management process, and/or for importing protected data from other systems. Further, an ability to provide functionality is described, notwithstanding that the integrated system has entered a tamper triggered state. Specifically, limited functionality with no access to secret data and applications can be automatically provided, as well as a mechanism for recovering full functionality with limited service facility dependency.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 11 depicts one embodiment of a process for managing and updating a key set employed by a data access control function of an integrated systems, in accordance with an aspect of the present invention;

BEST MODE FOR CARRYING OUT THE INVENTION

Figure 1:
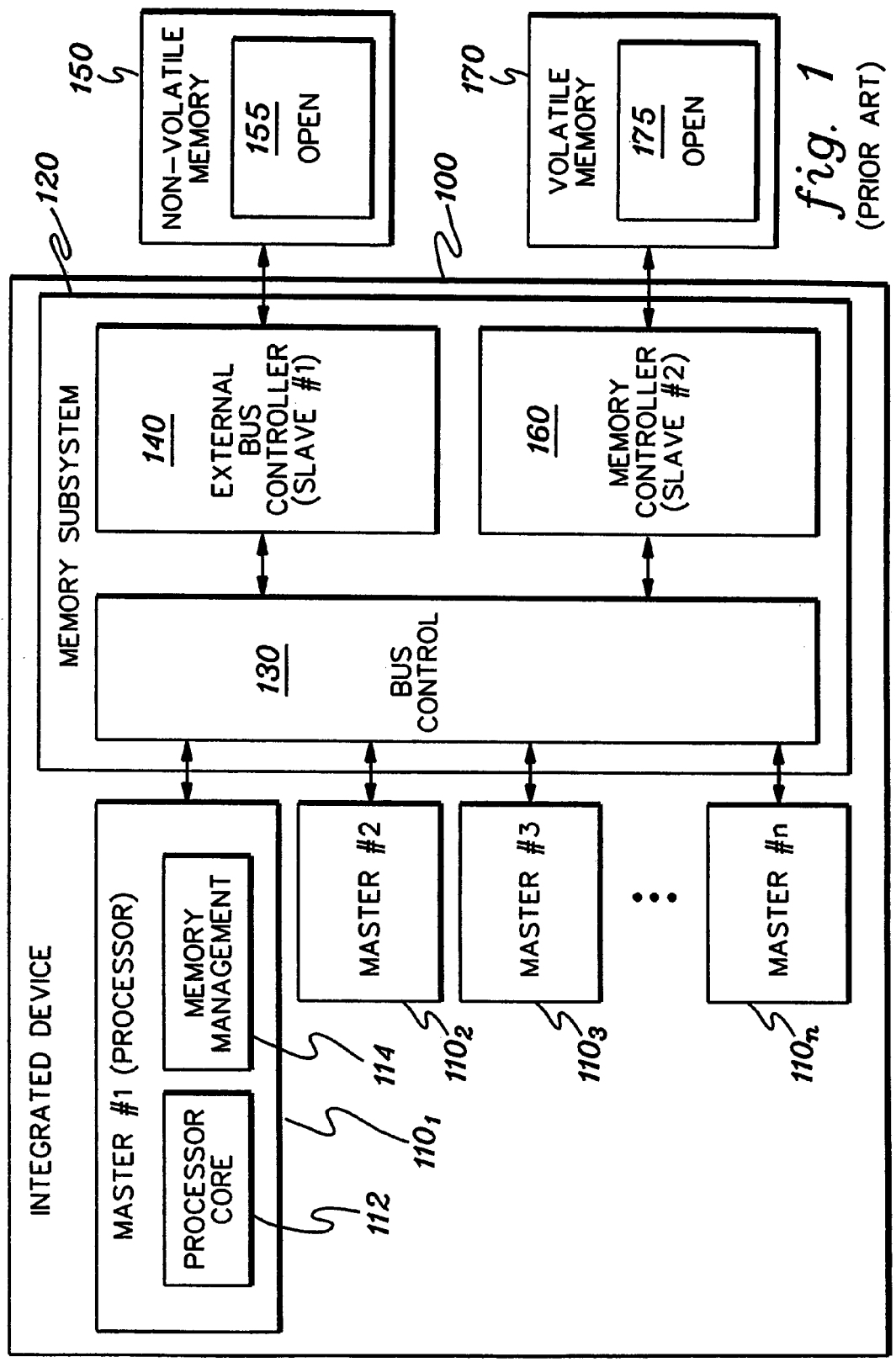
FIG. 1 depicts one example of a typical integrated device employing common memory access through a memory subsystem.

FIG. 1 depicts a conventional integrated device, generally denoted 100, having multiple internal functional masters 1101, 1102, 1103 . . . 110$n$. Master 1101 is shown as a processor, having a processor core 112 and a memory management unit 114. Internal masters 1101, 1102, 1103 . . . 110$n$ connect in this example to a memory subsystem 120, which includes bus control logic 130 of a shared bus. Those skilled in the art will understand that although shown within the memory subsystem, bus control 130 could alternatively reside outside of subsystem 120.

Bus control unit 130 coordinates and consolidates requests to slaves in the integrated device. For example, a first slave might comprise an external bus controller 140 which is connected to an external non-volatile memory 150, such as flash memory, having an open memory portion 155. A second slave, memory controller 160 connects to external volatile memory 170, such as SDRAM or DRAM. Memory 170 includes an open memory portion 175. In general, functions share a common memory pool in this integrated design in order to minimize memory costs, and to facilitate transfer of data between functions. As such, all internal masters have equal access to both non-volatile and volatile memory, and both storage spaces are labeled open, meaning that there are no limits on data access.

Typically, non-volatile memory is used for persistent storage, wherein data should be retained even when power is removed. This memory may contain the boot code, operating code, such as the operating system and drivers, and any persistent data structures. Volatile memory is used for session oriented storage, and generally contains application data as well as data structures of other masters. Since volatile memory is faster than non-volatile memory, it is common to move operating code to volatile memory and execute instructions from there when the integrated device is operational.

Note that in a typical system such as presented in FIG. 1, there are several security risks. Namely, 1. The behavior of the processor can be controlled by modifying the operating code or data structures, and internal data or operation can be compromised.

2. In certain cases, such as a communication controller, etc., an internal master can be controlled by an external source, and can be used to compromise internal code or data since memory is shared.

3. Debug and development tools that are used in software development can be used to modify or monitor the processor's behavior.

4. A given master can unintentionally corrupt or compromise the operation of another internal master since memory is shared.

The solution presented herein to the above-noted security risks involves providing an access control function disposed within the data path between the bus control and the slave devices. This access control function can use (in one embodiment) characteristics of the internal bus that connects the functional masters to the slave devices to allow each request for access to be further qualified based on a set of secure control information, and if desired, to be prevented. Advantageously, this access control function provides the ability to differentiate accesses by which master is making the data request, as well as where the data is stored, and then to either grant or limit access accordingly, or to otherwise qualify the access. Additional access control functionality is also described herein in accordance with other aspects of the present invention.

Figure 2:
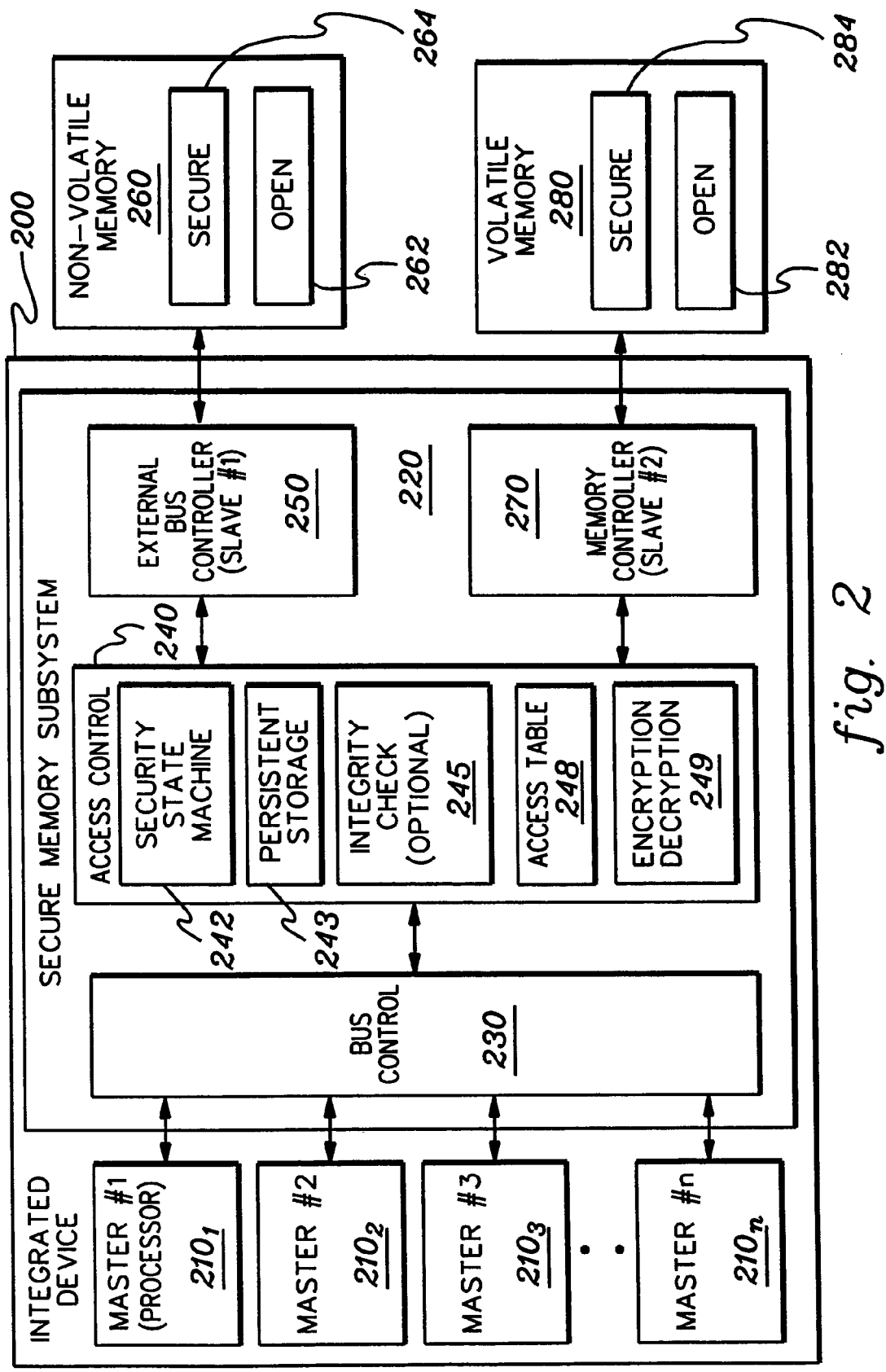
FIG. 2 depicts one embodiment of an access control function implemented within a secure memory subsystem of an integrated device, in accordance with an aspect of the present invention.

FIG. 2 illustrates one embodiment of a system, generally denoted 200, which includes an access control function 240 in accordance with an aspect of the present invention. System 200 again includes multiple functional masters 2101 . . . 210n which communicate via a bus control 230 with one or more slaves 250 & 270. In this case, access control function 240 intercedes in the data path between bus control 230 and slaves 250 & 270. As an alternate embodiment, bus control unit 230 could reside outside of the secure memory subsystem unit. As shown, a first slave device comprises an external bus controller 250, and a second slave device comprises a memory controller 270. In this context, the combination of the bus control unit, access control unit and external controllers form the secure memory subsystem 220. As a result, the external address space defined as non-volatile memory 260 and volatile memory 280 can be further divided into open area 262 and secure area 264, as well as open area 282 and secure area 284, respectively. In this use, "secure" implies that masters 2101 . . . 210n can only access a space as defined in the access control unit 240. Note that the access control function controls all accesses to both open and secure areas.

A detailed description of the access control function of unit 240 is included in the above-incorporated application entitled "Control Function Employing A Requesting Master ID And A Data Address To Qualify Data Access Within An Integrated System". Further, the above-incorporated application describes in detail the use of an access table 248 and an encryption/decryption function 249 in qualifying requests for data based on an access level of the functional master requesting the data and the address of the data requested.

Briefly described, a request from a master granted control by the bus control unit is sent to the access control unit, along with the requested address and associated controls (e.g., read or write, etc.). The access table is used by the access control function to compare the requested address, master id, and read or write indicator to a definition of allowed access capability for that master. The given request can either be blocked (terminated), allowed in the clear, or allowed with encryption/decryption. If the requested transfer is allowable, then the bus signals are propagated to the slaves, and access parameters associated with the request based on the access table are sent to the encryption/decryption engine, i.e., if encryption/decryption is applicable. The encryption/decryption engine can be used to encrypt write data as the data is transferred to a given slave, or decrypt read data as the data is returned from a given slave using the associated access parameters.

In addition to the functions of qualifying data access based on the requesting master id and the address of the request, the concept of adding a security state machine 242 to the access control function to, for example, control operation of the access table 248 and encryption/decryption function 249 is described in the above-incorporated application entitled "Control Function With Multiple Security States For Facilitating Secure Operation Of An Integrated System". On-chip storage 243 is also used in conjunction with the security state machine 242 to hold a substitute boot address 245 and a master key set 246. This storage is persistent in that values are retained even when general power is removed. As a result, once initialized, these values can be used from session to session until specifically reset or erased with a change in security state as described hereinbelow.

The security state machine of the data access control function can be one state of multiple possible security states, including a null state and a secured state. In the secured state, the control function replaces a standard boot code address associated with the request for boot code with a substitute boot code address. The substitute boot code address addresses an encrypted version of boot code, which is then decrypted by the control function employing a master key set held in the persistent storage. When in the null state, the master key set is erased.

As a further enhancement of the above-described data access control function, the concept of adding a control capability to selectively authenticate requested data is described in the above-incorporated application entitled "Control Function Implementing Selective Transparent Data Authentication Within An Integrated System". This selective authentication can be transparent to the functional master of the integrated device initiating the data request. The requested data can either comprise code or data that is stored in encrypted form in external memory. (Note that "data" is generically used herein in places, including the claims, to refer to code or data.) While the encryption capabilities of the above-described data access control function prevent direct observation and modification of data, the integrity check function adds the ability to further verify that the encrypted value is the same value that was written to memory originally.

In one embodiment, an integrity check function in accordance with an aspect of the present invention works in conjunction with the access table and access parameters described in the above-incorporated applications. Address ranges that are to be associated with authenticated data can be indicated by an additional parameter in the access table. The integrity check function 245 determines the location of integrity values in memory based on the requested data transfer, and also calculates and compares the integrity values as described below.

Briefly summarized, the processes can be divided into pre-storage and post-storage steps, for example:

Pre-Storage

Generate a first integrity check value which is a mathematically condensed version of the data to be secured and authenticated.

Encrypt the data and encrypt the first integrity check value.

Store the encrypted integrity value and store the encrypted data in memory.

Post-Storage

Retrieve and decrypt the integrity value, and retrieve and decrypt the encrypted data from memory.

Generate a second integrity check value using the same function as employed in generating the first integrity check value.

Compare the first and second integrity check values. If they match, the data is authenticated. Otherwise, the data has been corrupted and corrective action should be taken.

The integrity check function 245 may optionally be employed in combination with the enhanced, secure operation concepts for an integrated system described hereinbelow.

Figure 3:
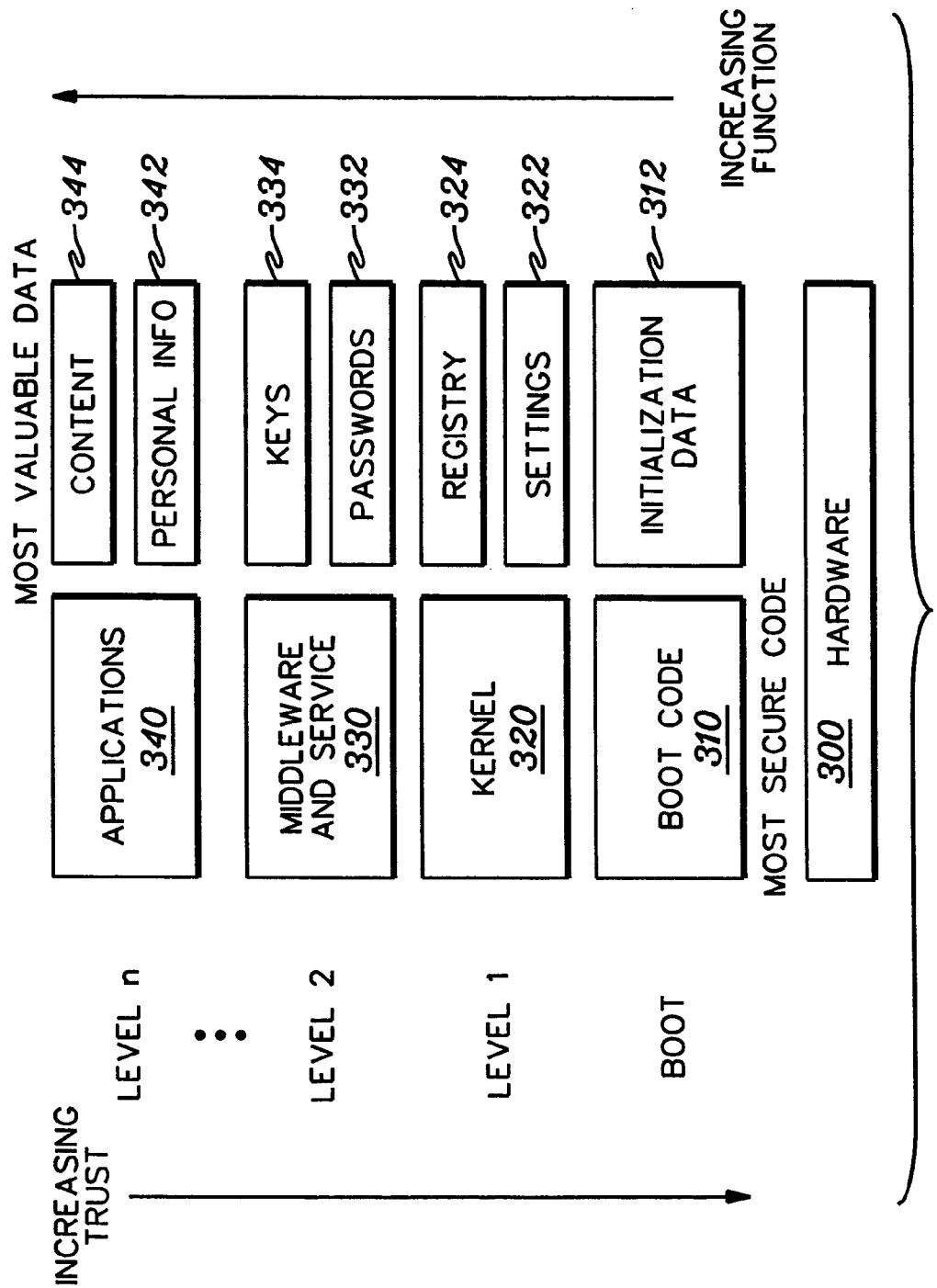
FIG. 3 illustrates a problem recognized and addressed by the secure operating techniques described herein, in accordance with an aspect of the present invention.

FIG. 3 is a representation of the levels of software used in a typical integrated device. As shown, the hardware 300 of the device is the base on which the software levels operate. Boot code 310 runs when the device is first turned on and performs initialization functions using initialization data 312. The kernel 320, abstracted as level 1, is called by the boot code after initialization. Kernel 320 provides operating system services and resources, including general system settings 322 and registrations 324. One or more levels of software are then called in succession including middleware and service functions 330 such as network services, file management, media handling, etc. that work with software access controls or passwords 332 and keys 334. Application software 340 resides atop the middleware and service software level 330, and works with user data such as personal information 342 and other content 344.

FIG. 3 illustrates one challenge in providing security for an integrated device or system. As a general rule, the closer the software level is to the underlying hardware, the more secure or trusted the software is. However, in contrast, the closer the software level is to a user, such as an application, the more valuable the data is. This leads to the least secure software protecting the most valuable data.

Figure 4:
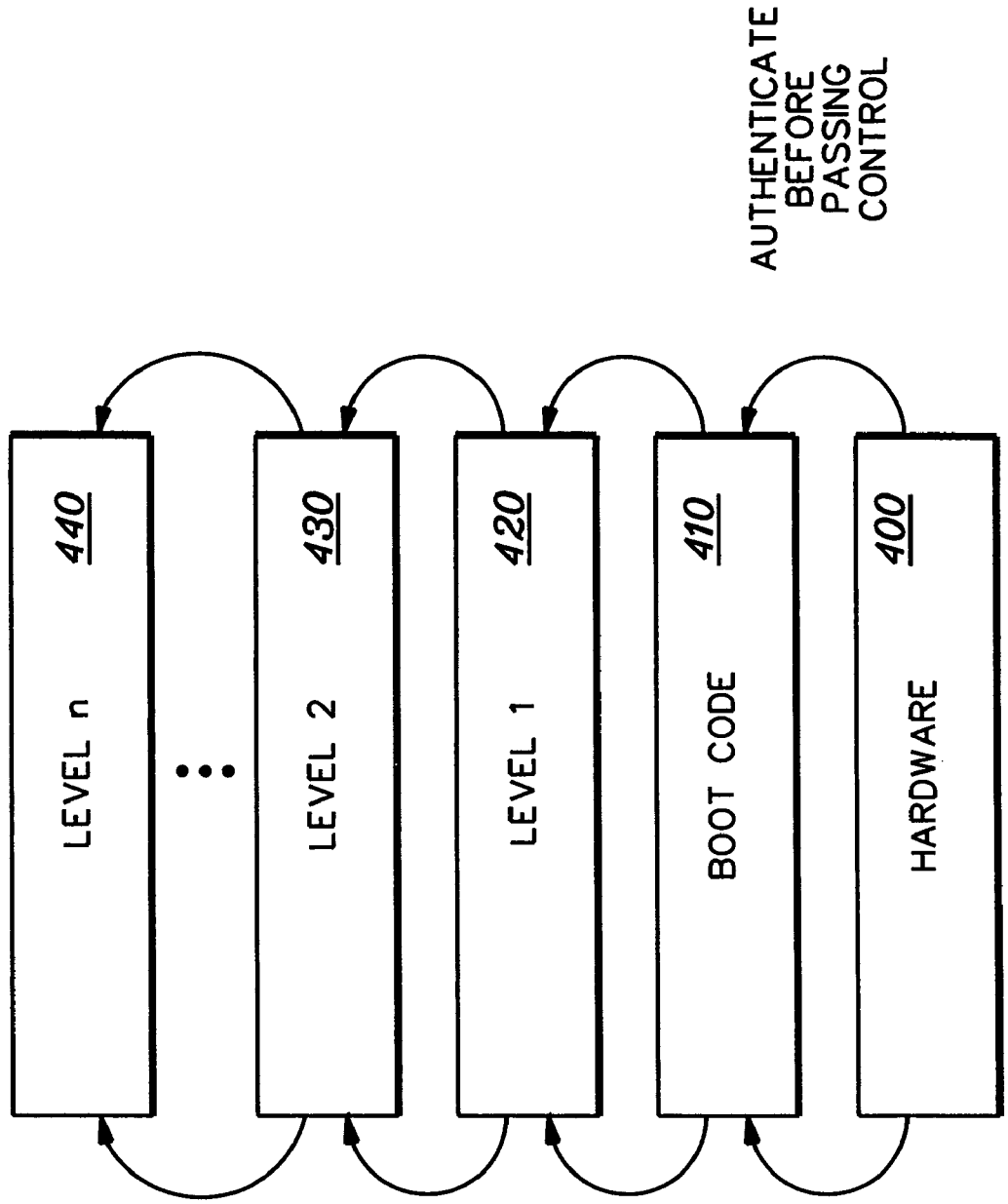
FIG. 4 depicts one embodiment of a technique for facilitating secure operation of an integrated device having multiple levels of software, in accordance with an aspect of the present invention.

FIG. 4 depicts an approach to providing security in an integrated system. Starting with the hardware 400, each level of software is authenticated by the underlying level. In the case of boot code 410, it is authenticated through the use of decryption and a master key set in the hardware, as defined in the above-incorporated applications, where boot code (or initialization code) is stored in encrypted form in external memory. Also, after authentication and prior to passing control to the next level of software 420, 430, 440, etc., each preceding level may limit the ability of the next level to control or modify the system. Therefore, as each level is loaded, each level is verified and the ability to effect the security of the system may be further restricted.

Figure 5:
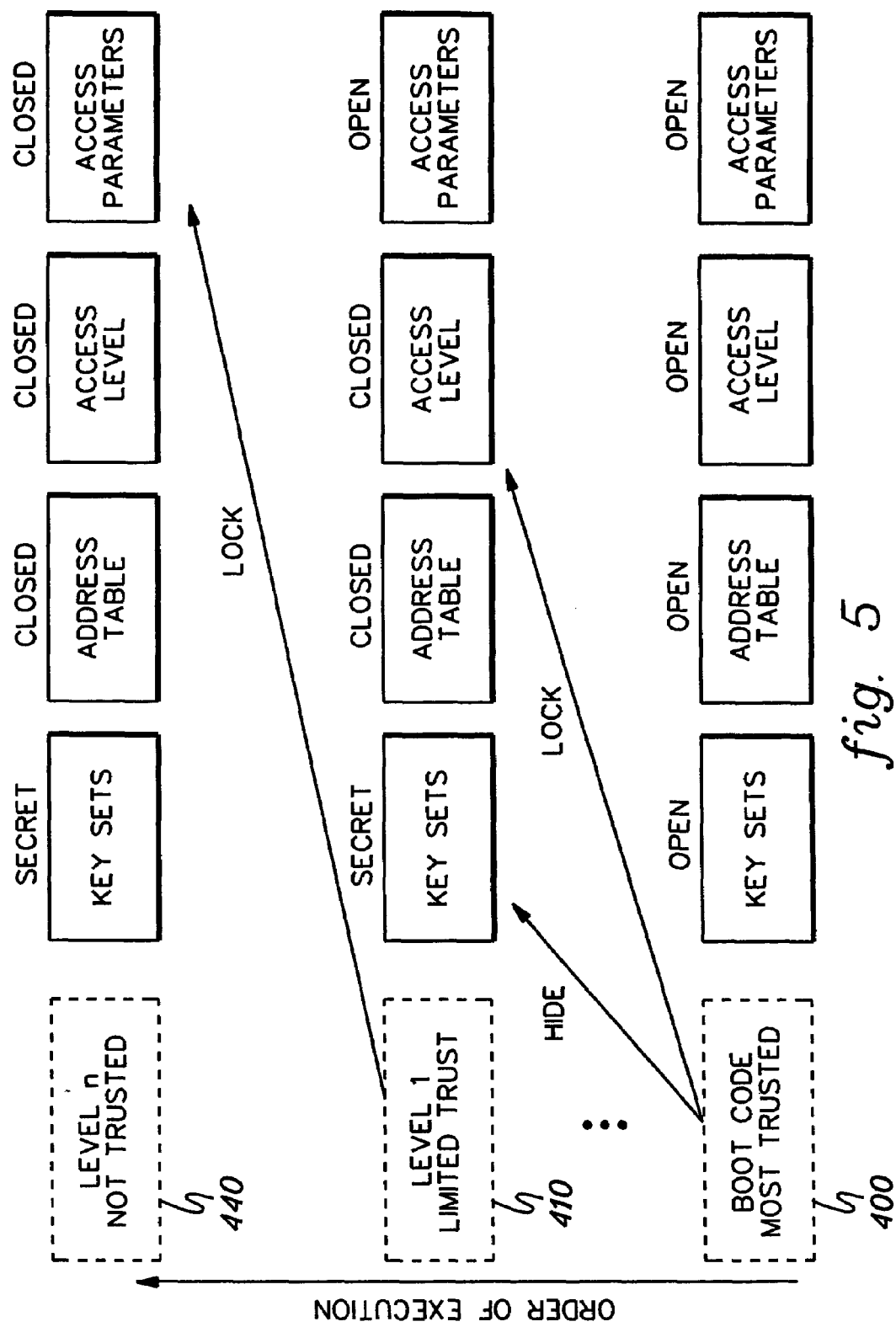
FIG. 5 depicts one embodiment of a process applying the techniques of FIG. 4 to an access table associated with a data access control function of an integrated system, in accordance with an aspect of the present invention.

FIG. 5 illustrates an implementation of the approach shown in FIG. 4 in the context of an integrated system such as described in FIG. 2. More particularly, this implementation is through the use of the access control function described above, and in the above-incorporated applications. The boot code 400 is authenticated by the hardware as described above, and so is considered the most trusted level of software. The boot code is able to fully configure the access control function, including the key sets used in decryption, the address table that defines how addresses are translated, the access level that specifies the allowed transactions based on master id and address range, and also the access parameters that define how the request is processed. Again, all of this information is maintained by the access control function described above.

Prior to passing control to the next level of software, i.e., level one 410, the boot code, in this example, hides the key values so they are not directly visible to software and also locks the address table and the access level entries (both contained within the access table) so that they cannot be modified by the next level of software. However, in this example, the access parameters can still be updated at this next level. Note that hiding can be accomplished in hardware by preventing read access, and locking can be accomplished in hardware by preventing write access. Those skilled in the art will understand that there are multiple ways of controlling (or locking) access to the registers of the access control unit, such as enforcing the use of privileged instructions, connecting the registers to on-chip private busses only, memory-mapping the registers and limiting the access to the registers using existing settings in the access control unit, etc.

As shown, prior to passing control to a least trusted software level 440, the last operational characteristics depicted of the access control function, i.e., the access parameters, are locked so that they cannot be modified.

Figure 6:
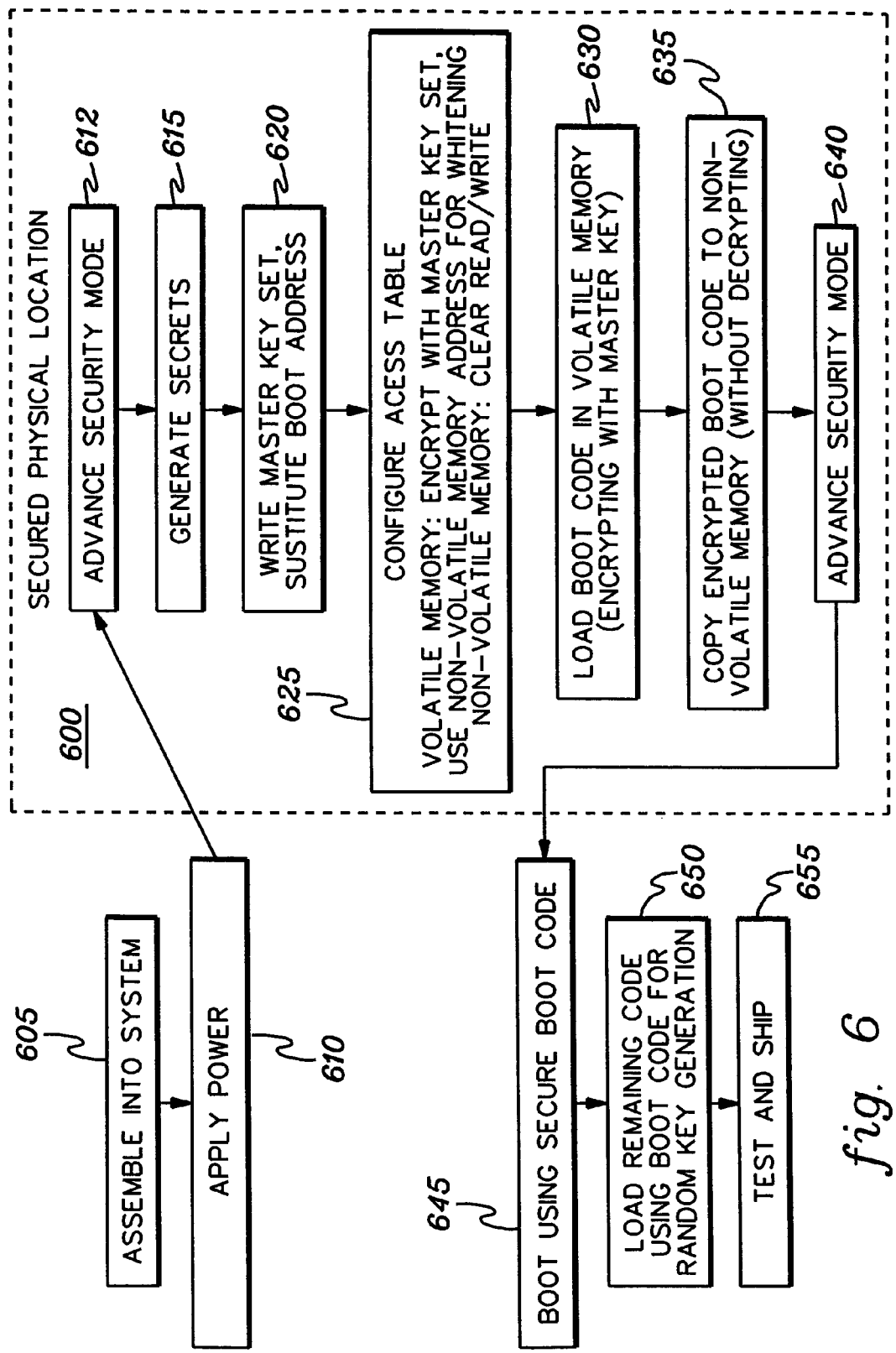
FIG. 6 depicts one embodiment of a process for loading code into an integrated system, in accordance with an aspect of the present invention.

FIG. 6 depicts one embodiment of a process for initializing a secure operating environment for an integrated device that has been assembled into a computing system. As shown, the integrated device is assembled into a larger system 605, and power is applied 610. The entire system or computing environment is moved to a physically secure environment 600 associated with the system manufacturer where the integrated device undergoes configuration for secure operation. In particular, the security mode is advanced 612, secret keys are generated 615, and the keys and substitute boot address are loaded in persistent storage 620 associated with the data access control function of the device. Note that the secret keys can either be provided by the manufacturer or generated by the integrated device itself. In the latter case, the keys may be optimally held in escrow.

The access table is next configured 625 so that data written to volatile memory will be encrypted with the master key set and use the non-volatile memory address for whitening, as described below in connection with FIGS. 7A & 7B. Data read from volatile memory will not be cryptographically processed and will remain unchanged. The access table is also configured so that data written to non-volatile memory will be unchanged.

The boot code is then loaded through a debug interface (see FIGS. 7A & 7B) and encrypted by the data access control function using the master key set as the data is written to volatile memory 630. The code is then copied from volatile memory to non-volatile memory without decryption thereof 635, as explained further below. Lastly, the integrated device is configured for secured mode 640, as described in the above-incorporated applications. Note that the result of this processing is that the encryption is unique to the particular integrated system.

At this point, the computing system can be removed from the physically secure location 600. The system is then re-booted using the loaded secure boot code 645, which can then be used to load additional code if desired in a secure manner through the use of encryption with self-generated key values 650. The final step in the process of FIG. 6 is to test and ship the computing system 655.

Figure 7A:
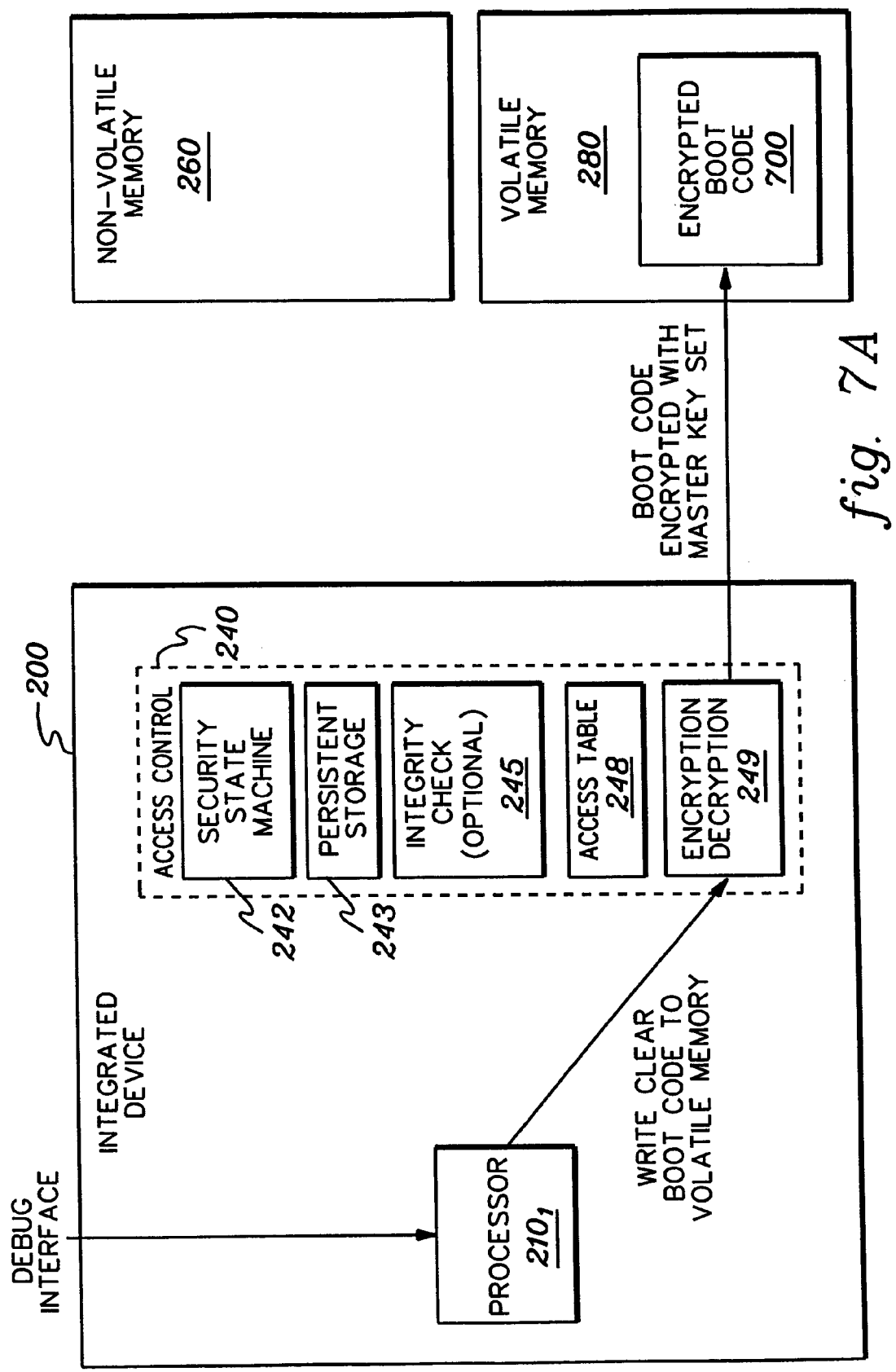
FIG. 7A depicts one example of a process for initially storing encrypted boot code in an integrated system, in accordance with an aspect of the present invention.

FIG. 7A further depicts processing 630 of FIG. 6. (Note that FIG. 7A and certain subsequent figures are a simplified depiction of the integrated system of FIG. 2, wherein the bus control and slave elements are omitted for clarity.) As shown, a debug interface or integrated development environment (IDE) can be used to load unencrypted boot code into the integrated device, which has been configured for secure operation. Integrated device 200 encrypts the boot code 249 using the internal master key, stored in persistent storage 243 of access control function 240, and writes the encrypted boot code 700 to a defined location in volatile memory 280. Note that the encrypted boot code is first written to volatile memory because non-volatile memory, such as flash memory, requires multiple operations to write a given data value and so could not be implemented as a block operation. Since the encrypted boot code 700 is to be later copied to another location in external memory, the access table 248 entry associated with the encryption operation is configured to use the ultimate address location in non-volatile memory as the value for whitening. Whitening is described further in one or more of the above-incorporated applications.

Figure 7B:
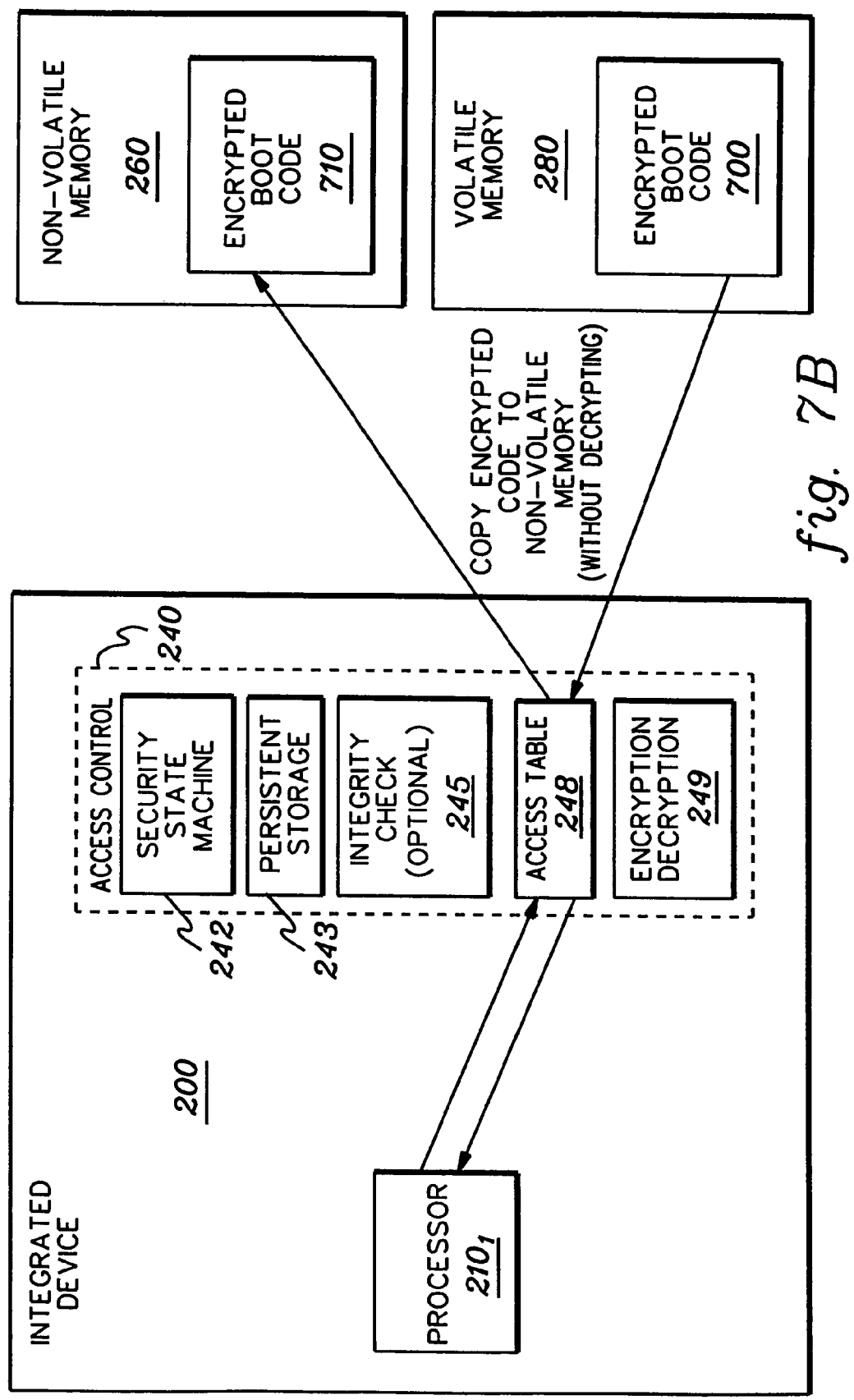
FIG. 7B depicts one example of a process for copying the encrypted code stored by the process of FIG. 7A from volatile memory to non-volatile memory, in accordance with an aspect of the present invention.

FIG. 7B illustrates process 635 for copying, for example, by processor 2101, the encrypted boot code from volatile memory to non-volatile memory 260. Since the boot code is already encrypted with the master key set and the non-volatile memory address for whitening, the boot code does not require any cryptographic transformation and is copied directly into the non-volatile memory without undergoing decryption.

Figure 8:
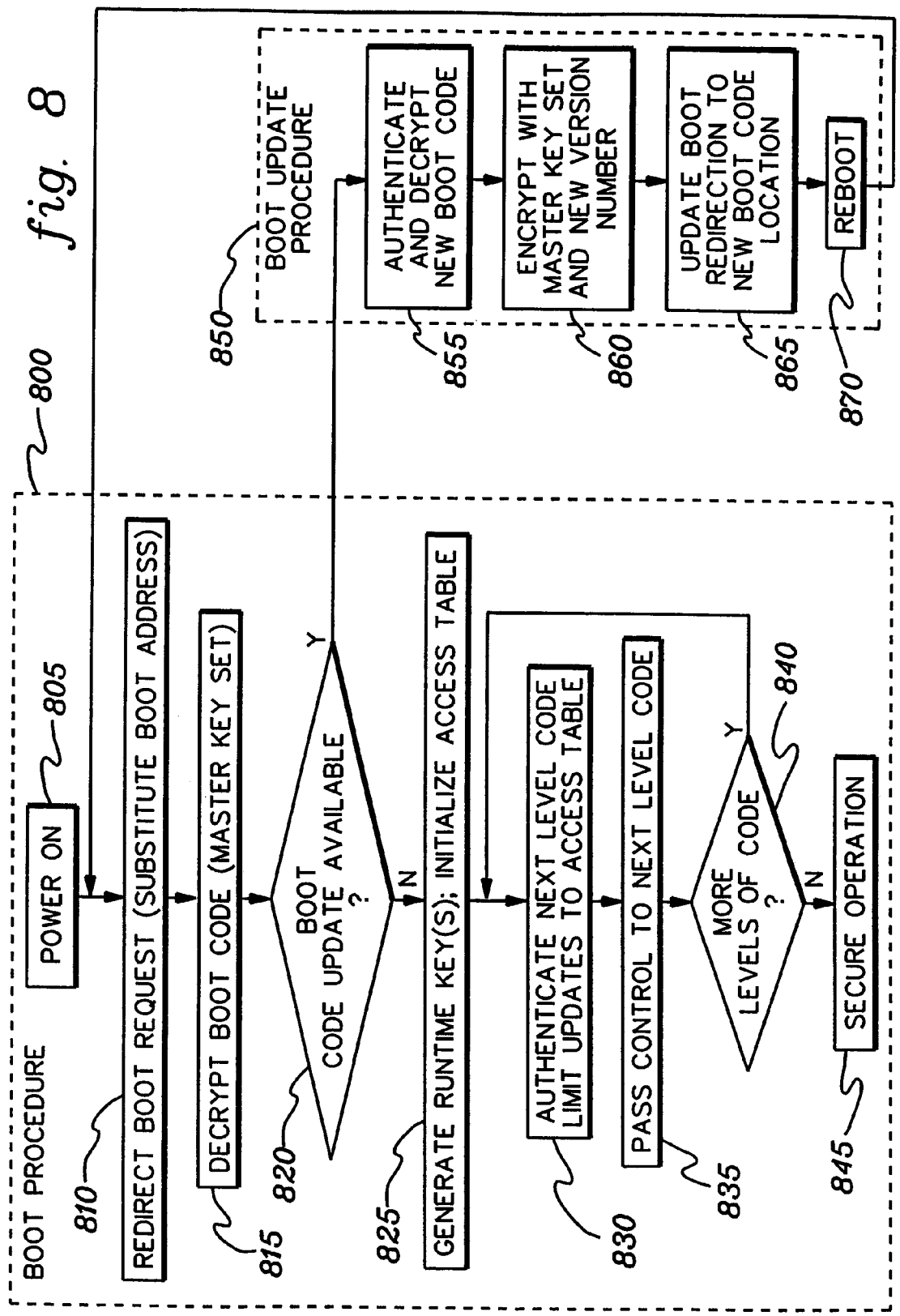
FIG. 8 depicts one embodiment of a process for authenticating levels of software and passing control between levels of software, as well as for updating boot code when a boot code update is available, in accordance with an aspect of the present invention.

FIG. 8 depicts a flowchart of one initialization process in accordance with an aspect of the present invention. Beginning with the boot procedure 800, the integrated device turns on 805 and issues a boot request which is redirected by the data access control function using the substitute boot address 810. The encrypted code fetched from memory is decrypted by the data access control function using the master key set 815. Among the first instructions executed, a check is made to see if an updated boot code image is available 820. This check should be done during the boot procedure itself since no other level of software may be authorized to make changes to the boot code.

If there is no update, the boot code generates the runtime keys to be used for the given session that is starting 825. Note that if there are data structures from previous sessions that must be used, the boot code can also retrieve encrypted key values that had been stored by the previous session. The boot code then authenticates the next level of software using established techniques to mathematically process the software image in memory to arrive at a unique digest or hash value and then compare the result to an expected value 830. This can be accomplished in software using the secure boot code. In addition to authorization, the boot code can also limit the ability of the next level of software to modify or even observe the security settings and the operational characteristics associated with the access control function. With both authentication and locking of security functions complete, control is passed to the next level of software 835. If this is a final level 840, then the process of loading software is complete and secure operation of the device can begin 845. If there are additional levels, the task of authenticating the next level and optionally locking security functions is performed again, and the loop continues until all levels are loaded.

If there is an update for the boot code, then from inquiry 820 the boot update procedure 850 is followed. First, the current boot code (i.e., the code which was running when the device was first turned on) is used to authenticate and decrypt the new boot code image 855. Note that the new image may have been transmitted to the system in an encrypted form that is different than that used by the integrated device internally. In such a case, the boot code performs a decryption step in software. The running boot code then writes the new boot code to memory using the access control function to encrypt the new code with the master key set of the integrated device in the same manner as when the system was first assembled 860. However, the new boot code image is written to a separate location than the running boot code so that if the system is unexpectedly interrupted during the procedure, the running boot code is complete and operational in memory. Once the new boot code image is completely authenticated and written to non-volatile memory, the running boot code updates the substitute boot address to point to the new boot code image 865. Once the update is completed, the system is restarted 870 and goes back to the beginning of the boot procedure 800. In an extension of this process, one or more levels of code other than the boot or initialization code may be added as required by a level of software having a higher security privilege. For example, the boot code could be used to update the kernel.

As an extension to the boot update procedure 850, a new version number can be associated with the new boot code image 860. This requires that a version number parameter be added to the values that are stored in on-chip persistent memory associated with the data access control function, as described in one or more of the above-incorporated applications. Again, the version number is used to perform the whitening procedure as part of the decryption of the first instructions. The advantage of including a version number for the boot code image is that it prevents an attacker from reusing an older boot code image by merely making a copy and then replaying it.

Figure 9:
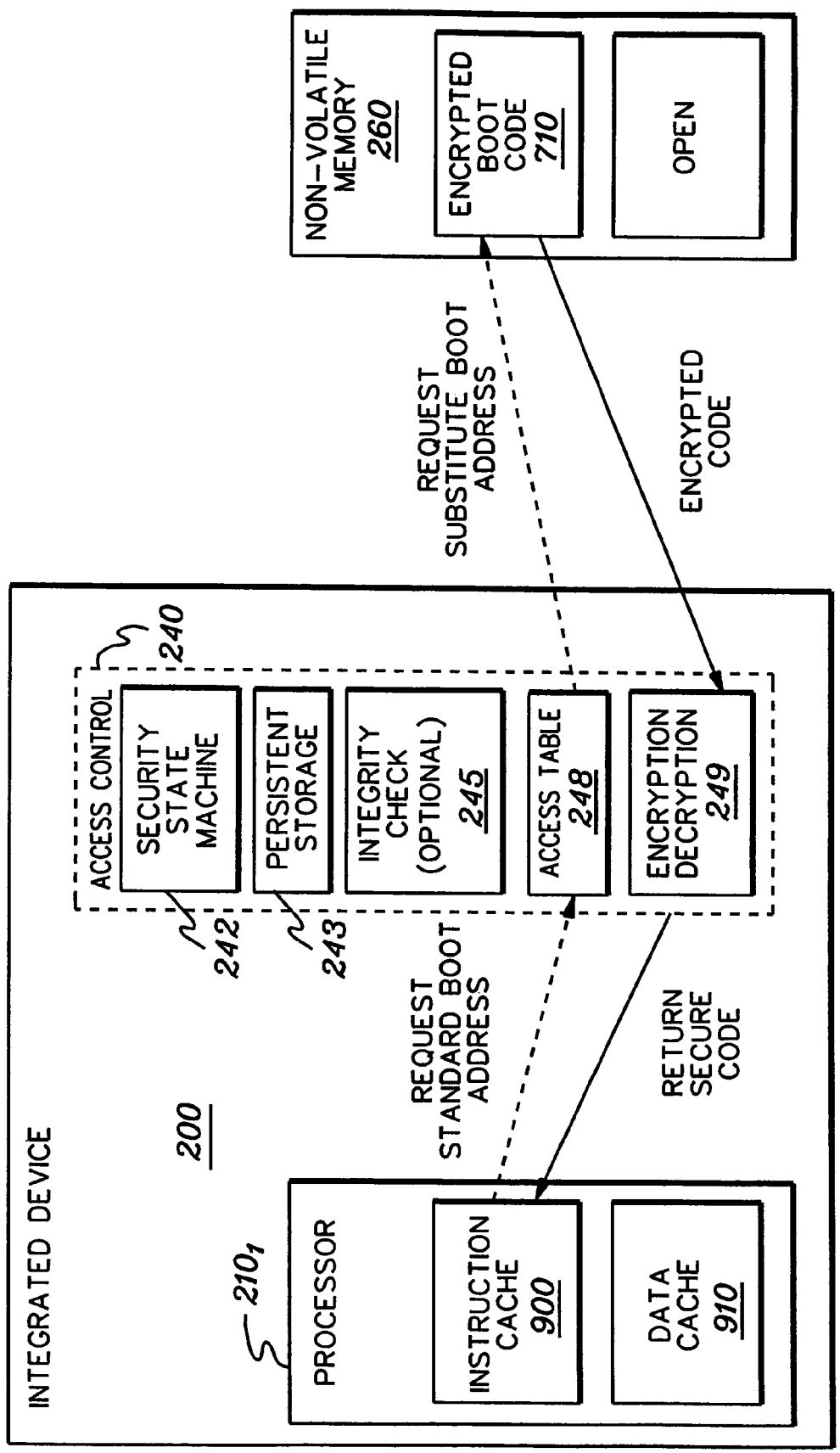
FIG. 9 depicts one embodiment of initialization signals passing between components of an integrated system with an access control function in a secured state, in accordance with an aspect of the present invention.

FIG. 9 depicts processing within an integrated system which is started using the boot processing of FIG. 8. When the main power for the integrated device is turned on, a first action is for processor 2101 to request data (boot code) from a predefined address. This external data request is passed to the data access control function 240, which identifies the request as a boot code request based on the address, and replaces all or part of the address with a substitute boot address contained in the control function's persistent storage 243. The modified request then continues to external memory 260. The substitute boot address is defined to point to a section of memory that contains code that has been previously encrypted using the master key set. This encrypted code 710 resides in a secure region of non-volatile memory 260. The encrypted code is returned to the access control unit which has been configured, based on the substitute boot address, to decrypt the returned data using the master key set. The decrypted (and secure) boot code is then returned to the processor for execution. The above steps are repeated as the processor executes the boot code sequence.

Figure 10:
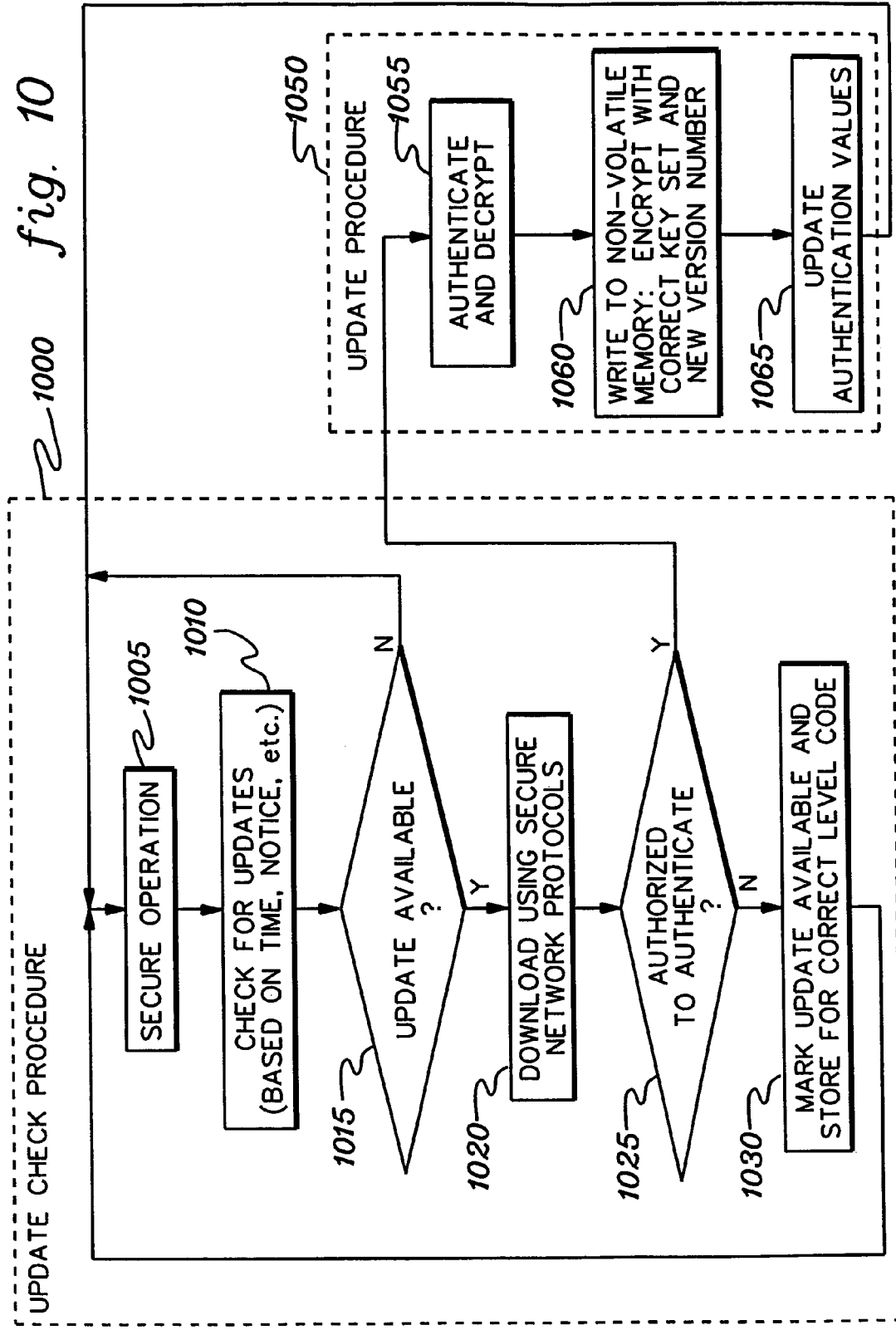
FIG. 10 depicts one embodiment of a process for securely updating a level of software within an integrated system having multiple levels of software, in accordance with an aspect of the present invention.

FIG. 10 depicts a process for accepting code updates while the integrated system is running. This update check procedure 1000 starts with the system running in secure operation mode 1005. Based on a conditional event, such as an internal periodic time trigger or external notification, etc., the system checks 1010 to see if an update is available 1015. If "no", then the integrated system returns to the previous secure operation state and continues. If an update is available, then the update can be downloaded using secure network protocols 1020 as established in the industry. Alternatively, the update could be read from fixed media. The current level of software then determines whether it is authorized to make the update requested 1025. As described above, a given level of software can only be authenticated by software of equal or higher level of authority.

If the current level of software is not authorized to make the update, then the software marks that an update is available and stores the update for use by the correct level of software when that level is next in control of the integrated device. Note that this generally requires storage in non-volatile memory so that the update is available for the next session.

If the current level of software is authorized, then update procedure 1050 is followed. This procedure includes authenticating and decrypting the update using the processes described above for updating boot code. However, it is not required to encrypt the update with the master key set. Rather, a runtime key can be employed instead. Also, the version number for the update does not need to be stored in on-chip persistent memory, but could be encrypted and stored in external secure memory since it will be loaded by the boot code 1060. Next, the authentication values are updated for use in verifying the updated code before loading during system initialization.

FIG. 11 depicts a process for managing keys and updating keys as required. In general, this process employs the data access control function as a means of migrating from one encryption form to another.

Excessive usage of a secret key on a unique data block adds to the number of samples potentially available for cryptanalysis. To protect a secret key, therefore, the number of samples employing the key should be limited. The limit depends upon the type of analysis an attacker may use and on the strength of the encryption algorithm, keys, and physical shielding employed. In today's technology, it is impractical to count accurately the number of times a secret key is used on unique data blocks. A close approximation to this counting, which would require the amount of storage per key set, would be to use a counter to record the number of write operations per key set, with the count being greater or equal to the number of unique samples created. As a less effective approximation, read and write operations could both be counted, but this would not mean that the count threshold could be increased.

As shown for the key management procedure 1100, runtime keys are generated (as described above in connection with the boot procedure) for use during a single session or across sessions 1105. At the same time, a key usage counter is initialized with a given threshold. This counter can be implemented in software, but is more advantageously implemented in hardware as part of the access control function since the information needed to drive the counter is available. Further, the counter can be associated with the on-chip persistent storage so that the count is maintained between sessions, or software can be used to capture the result, encrypt it, and store the result when the system is turned off; and then reload the count when the system is started again.

Control is optionally passed to the next level of software 1110. Note that the current level of software could alternatively continue and use the key directly. The key usage counter is incremented for each time the key is used to write encrypted data 1120. It could optionally be used to monitor read events but only in addition to write events, not in place of them.

At some point, the key usage counter will exceed the threshold 1125. When this occurs, if the same level of software is operating as initially generated the key, then the key update procedure 1150 is called 1130. If the current level of software is different, then the system returns to the level of software that originally generated the key and from there calls the key update procedure 1135.

The key update procedure 1150 employs the access control function to facilitate migrating from one key set to another. The access table of the access control function is first modified so that the current location of the data to be migrated is defined for decryption using the old key set, and the new location of the data is defined for encryption with the new key set 1155. Note that since the access table can be used to do address translation, the internal masters of the integrated system can see the current and new data locations as separate address ranges in memory, while the external requests after address translation could define both locations to be the same address range. This allows a given block to be read from its existing location, and then written back to the same location.

Using the new access table definitions, the data is then read from its current location and written to its new location, effectively re-encrypting the data with the new key set 1160. The access table is then again modified so that the new location is defined for encryption and decryption with the new key set 1165, and all references to the old key set and associated data locations are deleted 1170.

Figure 12A:
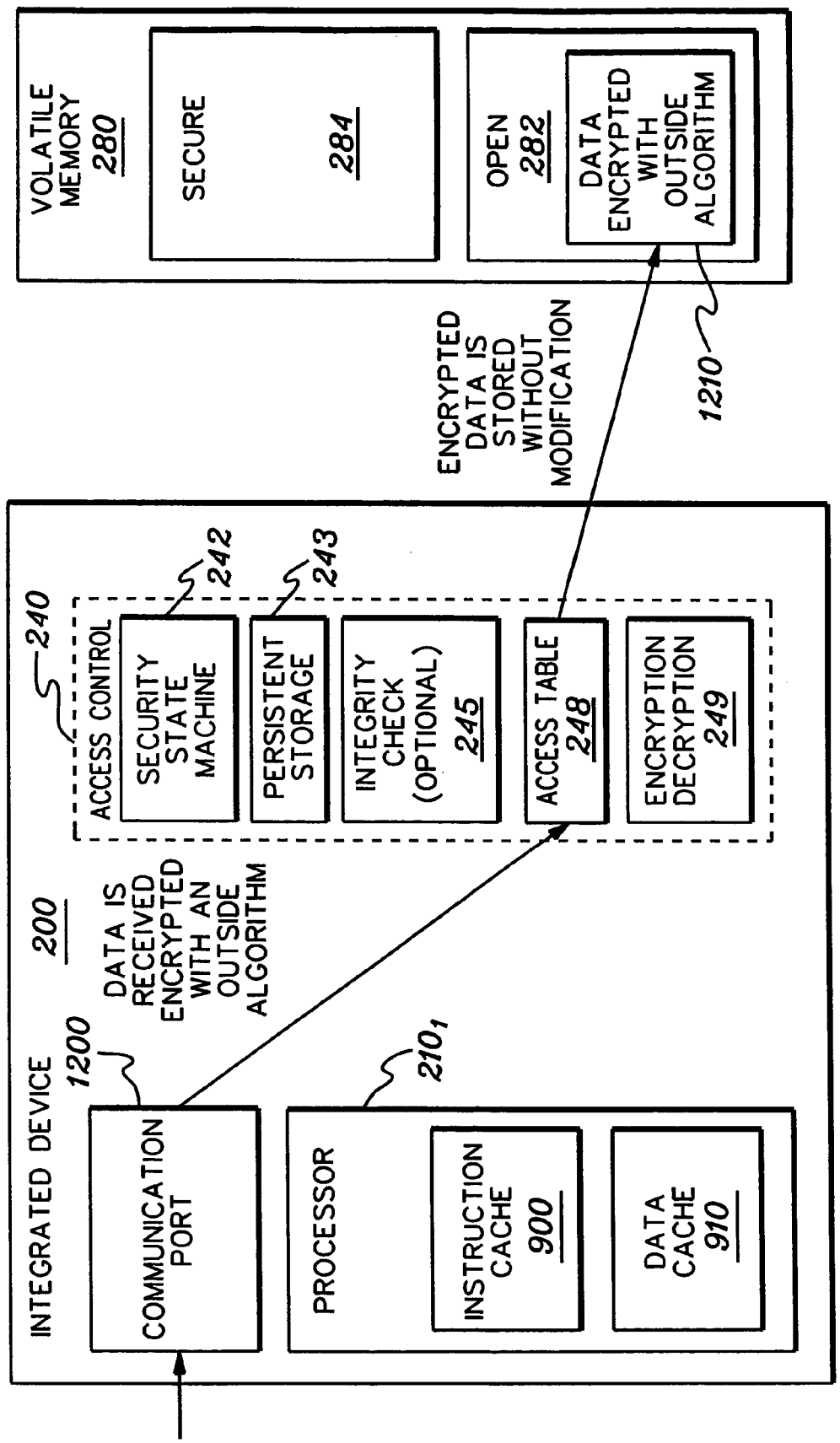
FIG. 12A depicts one embodiment of a process for receiving encrypted data for storage within an integrated system, in accordance with an aspect of the present invention.
Figure 12B:
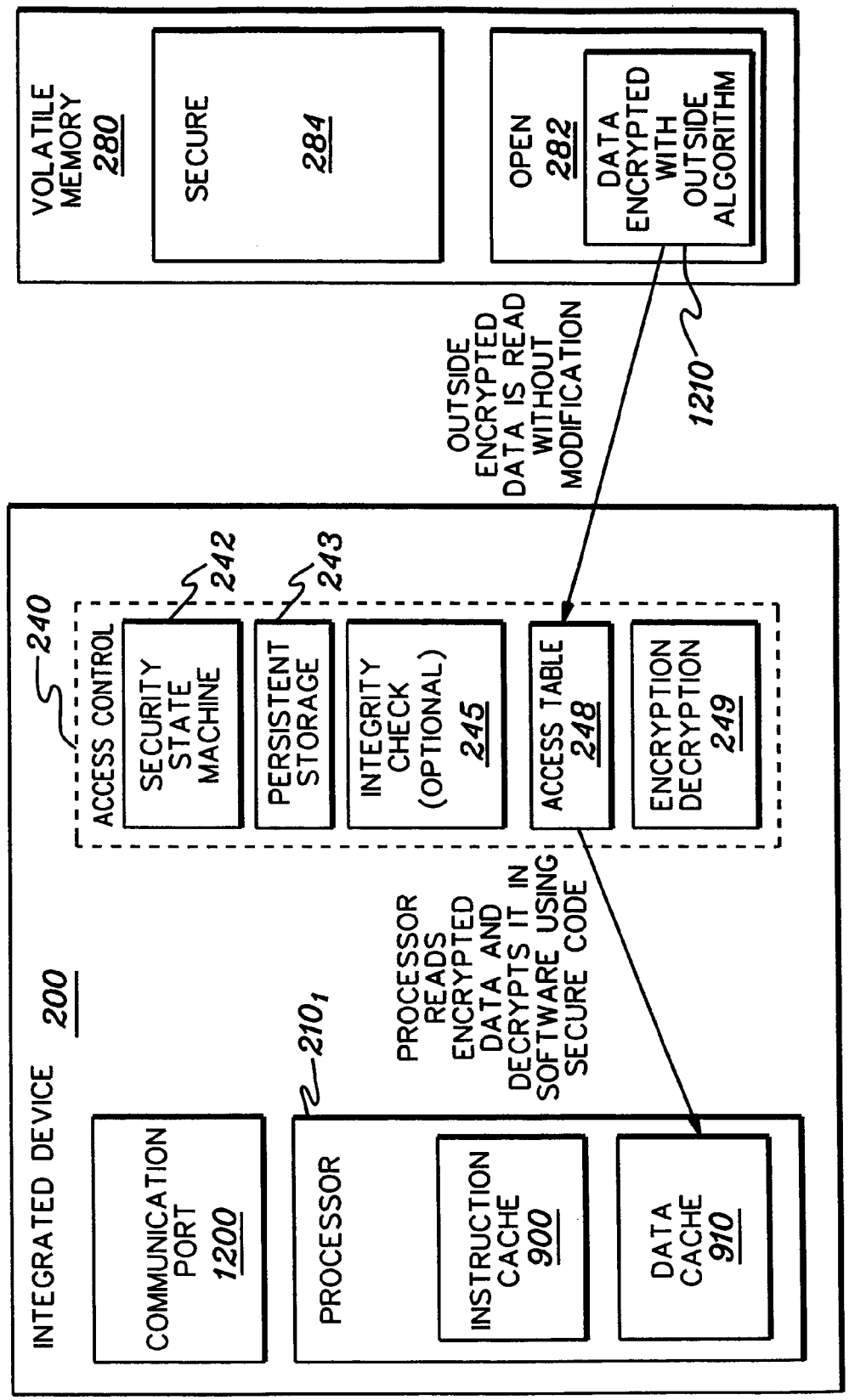
FIG. 12B depicts one embodiment of a process for retrieving the stored encrypted data of FIG. 12A and decrypting the data in software using secure code, in accordance with an aspect of the present invention.
Figure 12C:
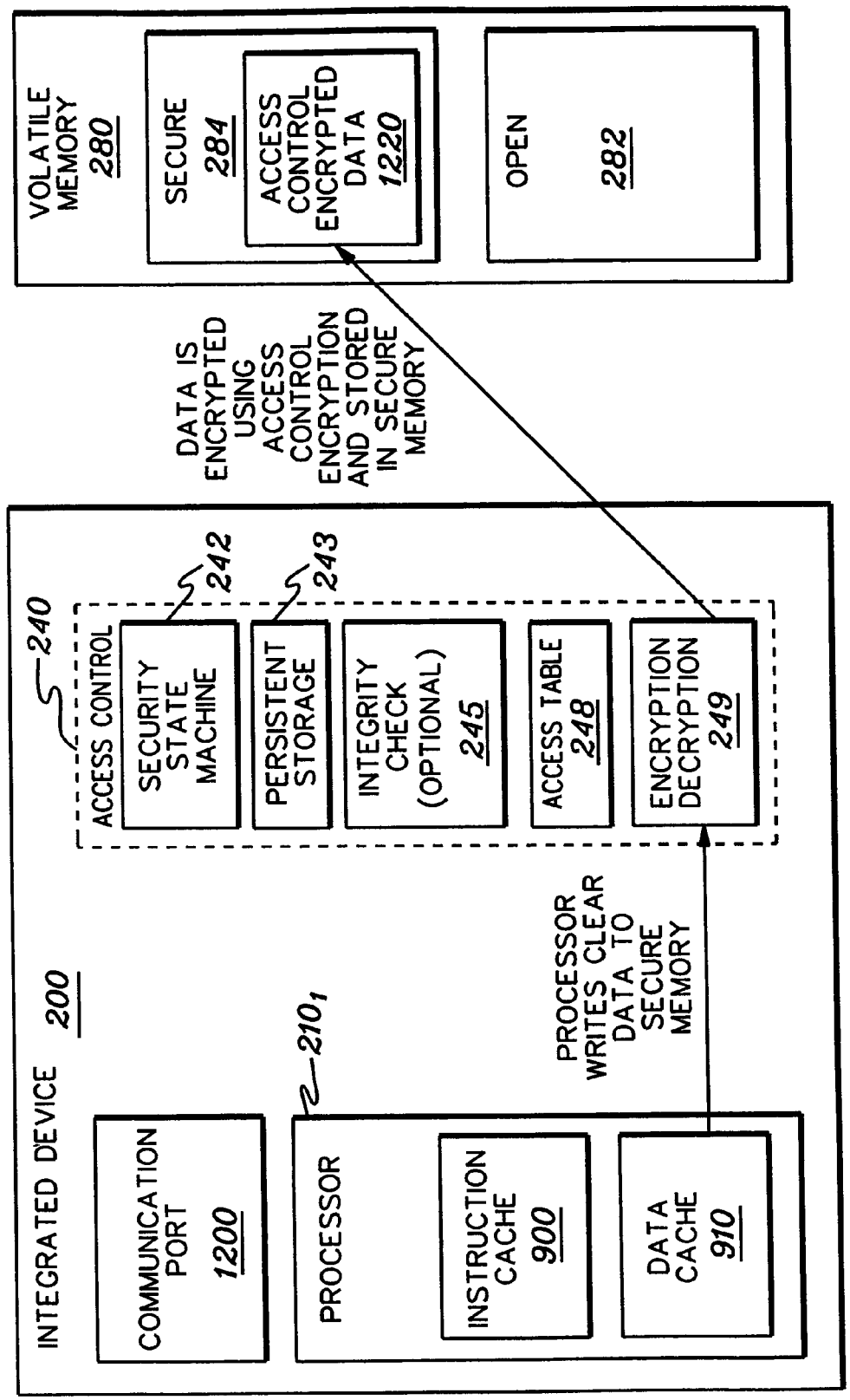
FIG. 12C depicts one embodiment of a process for re-encrypting the decrypted data using access control hardware for storage in secure memory, in accordance with an aspect of the present invention.

FIGS. 12A-12C illustrate a related technique for migrating data provided by an outside source from one encryption form to another. In this case, the outside encryption form could be a different algorithm and key set than the internal encryption approach. As shown in FIG. 12A, data is received, in this case through communication port 1200, from an outside source encrypted with an outside algorithm. The access control function 240 is defined to store this outside data directly in external memory 280 with no modifications. As shown in FIG. 12B, processor 2101 then reads the outside data into its cache in blocks, and decrypts a given block using software for the decryption. Once decrypted, the clear block is then written to external memory 280 as shown in FIG. 12C. However, the access control function is configured to encrypt the data using the internal algorithm and key set. The result of this process is that all data received from the outside is converted to an encrypted form that is unique and controlled by this one integrated device. This provides the advantage of preserving the security of encrypted data, while taking advantage of the hardware acceleration of the access control function.

Figure 13:
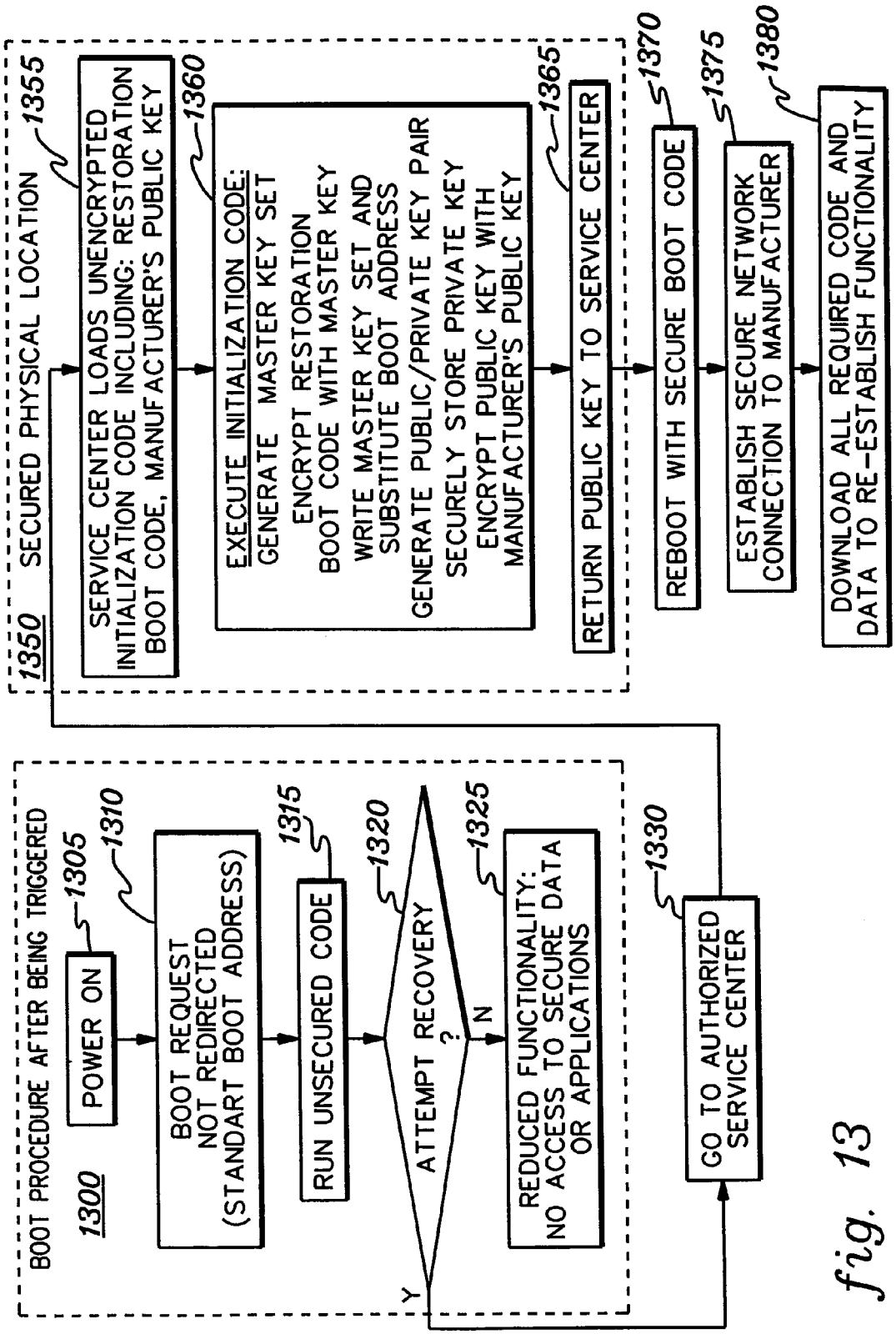
FIG. 13 depicts one embodiment of a process for recovering integrated circuit functionality following a tamper trigger event occurring within a computing environment of the integrated system, in accordance with an aspect of the present invention.

FIG. 13 depicts one embodiment of a process used to recover secure operation of an integrated system, after the integrated system is in use in the field and a tamper event has triggered the system to transition from secured state to a null state as described in one or more of the above-incorporated applications. As shown, by the boot procedure after being triggered 1300, the integrated system is turned on 1305 after the tamper event and the boot request is no longer redirected 1310. Unencrypted code is run from the standard boot address to initialize the system 1315. The initialized system operates with a reduced level of functionality such that access is no longer provided to secure data or applications 1325. Alternatively, an attempt to recover original integrated system functionality could be made 1320.

If an integrated system owner chooses to attempt a full recovery, then the integrated system is taken to an authorized service center which comprises a secured physical location 1350. The service center uses debug tools (see FIG. 7A) to load unencrypted initialization code, which includes restoration boot code and also the manufacturer's public key 1355.

The integrated system is then restarted to execute the initialization code, which will first generate a new master key set and then write the master key set into on-chip persistent storage associated with the data access control function 1360. The access control function is then configured to encrypt the restoration boot code using the master key set as described above in connection with FIG. 7A. The location of the new boot code is written into the substitute boot address field. The boot code then generates internally a public/private key pair, and securely stores the private key in non-volatile memory. The generated public key is encrypted using the manufacturer's public key (previously supplied with the initialization code), and returned to the service center, which then forwards it to the manufacturer 1365. At this point, the integrated system can be removed from the secured physical location 1350.

The system is restarted and the restoration boot code is executed 1370. The initialized system will establish a secure network connection to the manufacturer 1375, and then using known techniques, the data and code needed to reestablish the original functionality of the system can be downloaded and installed on the integrated system 1380.

To summarize, methods, systems and computer program products for initializing, maintaining, updating and recovering secure operation within an integrated system are described herein. These techniques employ a data access control function within the integrated system. The systems and computer program products may be broadly summarized as set forth below.

Provided herein in one aspect is a system for facilitating secure operation of an integrated system having multiple levels of software. This system includes means for authenticating, by a current level of software, a next level of software of the multiple levels of software before passing control of the integrated system to the next level of software. A data access controller is also provided which includes means for limiting the ability of the next level of software to modify an operational characteristic of the integrated system.

A system for initializing secure operation of an integrated system is also provided in another aspect. This system includes means for generating at least one key for the integrated system, and a data access control function within the integrated system. The data access control function receives initial code into the integrated system and encrypts the initial code using the at least one key. The initializing system further includes means for reinitializing the integrated system using the encrypted initial code.

A system for migrating data encrypted using a first key set to data encrypted using a second key set is additionally provided. This system includes means for decrypting within the integrated system data encrypted using a first key set; and a data access control function within the integrated system, which includes means for re-encrypting the data using a second key set.

In another aspect, a system for recovering integrated system functionality following a trigger event is described herein. This system includes means for automatically establishing a reduced level of functionality within the integrated system, as well as means for allowing full functional recovery of the integrated system through selective use of a designated recovery procedure.

In another aspect, at least one program storage device readable by a machine, tangibly embodying at least one program of instructions executable by the machine to perform a method of facilitating secure operation of an integrated system having multiple levels of software is provided. This method includes authenticating, by a current level of software, a next level of software of the multiple levels of software before passing control of the integrated system to the next level of software; and limiting ability of the next level of software to modify an operational characteristic of the integrated system, the limiting being implemented by a data access control function of the integrated system.

In still another aspect, at least one program storage device readable by a machine, tangibly embodying at least one program of instructions executable by the machine is provided to perform a method of initializing secure operation of an integrated system. The method includes generating at least one key for the integrated system; loading initial code into the integrated system, the loading including using the at least one key to encrypt the initial code via a data access control function of the integrated system; and reinitializing the integrated system using the encrypted initial code.

In yet another aspect, at least one program storage device readable by a machine, tangibly embodying at least one program of instructions executable by the machine is provided to perform a method of migrating data encrypted using a first key set to data encrypted using a second key set. The method includes: decrypting data encrypted using a first key set; and re-encrypting, by a data access control function within an integrated system, the data using a second key set.

In a further aspect, at least one program storage device readable by a machine, tangibly embodying at least one program of instructions executable by the machine is provided to perform a method of recovering integrated system functionality following a trigger event. This method includes: automatically establishing a reduced level of functionality within the integrated system; and allowing for full functional recovery of the integrated system by employing a selective recovery procedure.

Those skilled in the art will note from the above discussion that the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

The present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of recovering integrated system functionality following a trigger event, said method comprising:
    automatically establishing a reduced level of functionality within the integrated system;
    allowing for full functional recovery of the integrated system by employing a selective recovery procedure;
    wherein the recovery procedure includes loading initialization code into the integrated system at a secure physical location;
    wherein the loading of initialization code further comprises loading unencrypted initialization code into the integrated system, including restoration initialization code, and wherein the method further comprises:
        executing the restoration initialization code to obtain a master key and a substitute initialization address;
        encrypting the restoration initialization code with the master key and storing the encrypted initialization code at the substitute initialization address;
        reinitializing the integrated system using the stored encrypted initialization code at the substitute initialization address; and
    wherein the initialization code further comprises a manufacturer's public key, and wherein the method further comprises:
        generating at the integrated system a public/private key pair;
        securely storing the integrated system's private key; and
        encrypting the integrated system's public key using the manufacturers public key.

2. The method of claim 1, further comprising storing the master key and the substitute initialization address in persistent storage associated with a data access control function of the integrated system.

3. The method of claim 1, wherein the automatically establishing the reduced level of functionality within the integrated system includes limiting access to secure code and data within the integrated system.

4. A method of recovering integrated system functionality following a trigger event, said method comprising:
    automatically establishing a reduced level of functionality within the integrated system;
    allowing for full functional recovery of the integrated system by employing a selective recovery procedure;
    wherein the recovery procedure includes loading initialization code into the integrated system at a secure physical location;
    wherein the loading of initialization code further comprises loading unencrypted initialization code into the integrated system, including restoration initialization code, and wherein the method further comprises:
        executing the restoration initialization code to obtain a master key and a substitute initialization address;
        encrypting the restoration initialization code with the master key and storing the encrypted initialization code at the substitute initialization address;
        reinitializing the integrated system using the stored encrypted initialization code at the substitute initialization address; and
    further comprising establishing a secure network connection between the integrated system and manufacturer, the establishing employing the generated public/private key pair, and downloading across the secure network connection required code and data to reestablish full functionality of the integrated system.

* * * * *